United States Patent [19]

Niinami et al.

[11] 4,096,123
[45] Jun. 20, 1978

[54] POLYESTER ADHESIVE

[75] Inventors: Yoshiharu Niinami; Kuniomi Etoh, both of Otsu, Japan

[73] Assignee: Toyo Boseki Kabushiki Kaisha, Osaka, Japan

[21] Appl. No.: 640,388

[22] Filed: Dec. 12, 1975

[30] Foreign Application Priority Data

Dec. 16, 1974 Japan .................. 49-144638

[51] Int. Cl.² ................. C08G 63/68; C08G 63/12
[52] U.S. Cl. .................................. 260/75 N
[58] Field of Search .................... 260/75 N

[56] References Cited

U.S. PATENT DOCUMENTS

| | | | |
|---|---|---|---|
| 3,624,181 | 11/1971 | Munakata et al. | 260/75 N X |
| 3,835,099 | 9/1974 | Munakata et al. | 260/75 N |
| 3,985,664 | 12/1976 | Sakaguchi et al. | 260/75 N X |

*Primary Examiner*—Lucille M. Phynes
*Attorney, Agent, or Firm*—Brich, Stewart, Kolasch and Birch

[57] ABSTRACT

Disclosed is a polyester adhesive suitable for various substrates, especially metals, having as the effective component thereof a copolyester containing a tertiary amino group comprising: (1) a terephthalic acid residue,
(2) at least one dicarboxylic acid residue selected from the class consisting of aliphatic dicarboxylic acid residues and aromatic dicarboxylic acid residues other than a terephthalic acid residue,
(3) at least one alkylene glycol residue, and
(4) at least one glycol residue or dicarboxylic acid residue selected from the class consisting of glycol residues and dicarboxylic acid residues each possessed of the group represented by the generic formulas (I) through (V) given hereinbelow.

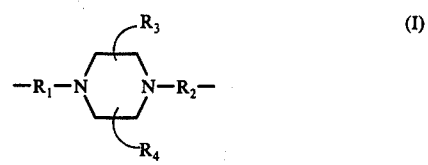

(I)

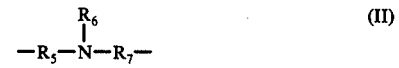

(II)

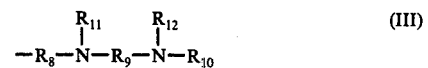

(III)

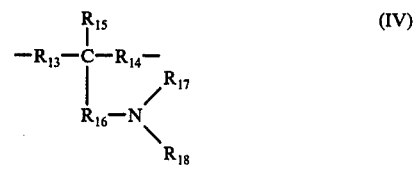

(IV)

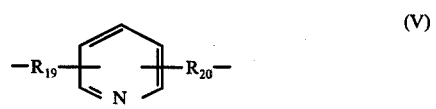

(V)

(wherein, $R_1$, $R_2$, $R_5$, $R_7$, $R_8$, $R_9$, $R_{10}$, $R_{13}$, $R_{14}$, $R_{16}$, $R_{19}$, and $R_{20}$ are each an alkylene group of 1 to 15 carbon atoms, $R_6$, $R_{11}$, and $R_{12}$ are each a hydrogen atom or an alkyl group of 1 to 10 carbon atoms, $R_{17}$ and $R_{18}$ are either, independently, a hydrogen atom or an alkyl group of 1 to 4 carbon atoms or, in combination, make up a polyethylene group which may form a heterogeneous ring in conjunction with the adjoining nitrogen atom, $R_3$ and $R_4$ are each an alkyl group of 1 to 10 carbon atoms, and $R_{15}$ is an alkyl group of 1 to 3 carbon atoms or

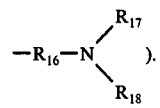

).

6 Claims, No Drawings

POLYESTER ADHESIVE

FIELD OF THE INVENTION

This invention relates to a polyester adhesive. More particularly the present invention relates to the type of polyester adhesive which exhibits an extremely high degree of adhesive strength, i.e. two to three times the adhesive strength of the conventional polyester adhesives, with respect to metals.

BACKGROUND OF THE INVENTION

In recent years numerous adhesives using polyamides, polyesters, polyacrylates, etc. as their effective components have been developed in rapid succession. Particularly, various polyester adhesives improved in adhesive strength, mechanical properties and thermal properties are being studied from numerous angles. While the present inventors have carried out one research after another on various types of polyester adhesives, there has been felt a need for developing polyester adhesives possessed of further advanced adhesive properties to meet increasingly wider diversifications in methods of adhesion, varieties of substrates subjected to adhesion, attributes expected of adhesives such as, for example, various forms of adhesive strength including shear strength and peel strength and to satisfy requirements for higher levels of thermal, mechanical and electrical properties. The conventional polyester adhesives such as those of polyethylene terephthalate-sebacate, polyethylene-tetramethylene terephthalate-adipate, polytetramethylene terephthalate-isophthalate, and polytetramethylene terephthalate-isophthalate-sebacate exhibit relatively low adhesive strength to metals compared with other forms of adhesive strength. They have, consequently, entailed a disadvantage that their effective use is obtained on limited kinds of substrates and they fail to provide necessary adhesion to building materials, mechanical parts, electrical devices and so on which demand high adhesive strength.

SUMMARY OF THE INVENTION

The primary object of the present invention, therefore, is to provide a polyester adhesive of the type which possesses high adhesive strength with respect to various types of substrates and proves to be useful for the adhesion of metallic materials in particular.

The inventors carried out a study with a view to accomplishing the object described above. They have consequently made a discovery that a copolyester which contains in the polymer chain thereof (1) a terephthalic acid residue, (2) at least one dicarboxylic acid residue selected from the class consisting of aliphatic dicarboxylic acid residues and aromatic dicarboxylic acid residues other than terephthalic acid residue, (3) at least one alkylene glycol residue, and (4) at least one glycol residue or dicarboxylic acid residue selected from the class consisting of glycol residues and dicarboxylic acid residues containing tertiary amino groups is useful as an adhesive for various substrates, particularly for the adhesion of metallic materials.

DETAILED DESCRIPTION OF THE INVENTION

The adhesive of the present invention is a polyester adhesive having as the effective component thereof a copolyester containing a tertiary amino group comprising (1) a terephthalic acid residue,
(2) at least one dicarboxylic acid residue selected from the class consisting of aliphatic dicarboxylic acid residues and aromatic dicarboxylic acid residues other than a terephthalic acid residue,
(3) at least one alkylene glycol residue, and
(4) at least one glycol residue or dicarboxylic acid residue selected from the class consisting of glycol residues and dicarboxylic acid residues each possessed of the group represented by the generic formulas (I) through (V) given hereinbelow.

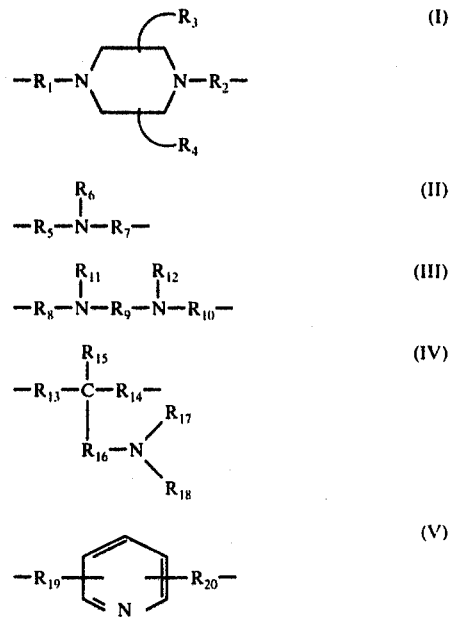

(wherein, $R_1$, $R_2$, $R_5$, $R_7$, $R_8$, $R_9$, $R_{10}$, $R_{13}$, $R_{14}$, $R_{16}$, $R_{19}$, and $R_{20}$ are each an alkylene group of 1 to 15 carbon atoms, $R_6$, $R_{11}$, and $R_{12}$ are each a hydrogen atom or an alkyl group of 1 to 10 carbon atoms, $R_{17}$ and $R_{18}$ are either, independently, a hydrogen atom or an alkyl group of 1 to 4 carbon atoms or, in combination, make up a polymethylene group which may form a heterogeneous ring in conjunction with the adjoining nitrogen atom, $R_3$ and $R_4$ are each an alkyl group of 1 to 10 carbon atoms, and $R_{15}$ is an alkyl group of 1 to 3 carbon atoms or

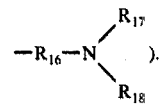

The terms "acid residue" and "glycol residue" as used in the present invention mean the configurational forms of the indicated acid and glycol contained in the polyester; the "acid residue" referring to the group remaining after removal of a hydroxyl group from the relevant carboxylic acid and the "glycol residue" to the group remaining after removal of a hydrogen atom from each of the terminals of the relevant glycol.

As the dicarboxylic acids and functional derivatives thereof which provide terephthalic acid residues for the present invention, there can be cited terephthalic acid, dimethyl terephthalate, diethyl terephthalate and so on.

Of the dicarboxylic acid and functional derivatives thereof which provide aliphatic dicarboxylic acid residues for the present invention, particularly desirable are those aliphatic dicarboxylic acids having 2 to 20 carbon atoms and their functional derivatives; examples being oxalic acid, succinic acid, adipic acid, suberic acid, azelaic acid, sebacic acid, undecanedioic acid, dodecanedioic acid, brassylic acid, tetradecanedioic acid, and lower alkyl esters and chlorides of said dicarboxylic acids.

Examples of the carboxylic acids and functional derivatives thereof which provide aromatic dicarboxylic acid residues other than a terephthalic acid residue include isophthalic acid, ortho phthalic acid, 2,6-naphthalene dicarboxylic acid, 2,7-naphthalene dicarboxylic acid and lower alkyl esters and chlorides of said dicarboxylic acids.

Of the alkylene glycols which provide alkylene glycol residues for the present invention, particularly desirable are alkylene glycols having 2 to 10 carbon atoms; specific examples being ethylene glycol, propylene glycol, tetramethylene glycol, pentamethylene glycol, hexamethylene glycol, heptamethylene glycol, octamethylene glycol, nonamethylene glycol, decamethylene glycol, and neopentyl glycol.

Examples of glycols and dicarboxylic acids and functional derivatives thereof which provide the glycol residues and dicarboxylic acid residues possessed of the groups of the aforementioned generic formula (I) through (V) are listed below.

(1) Glycols which are possessed of groups represented by the generic formula (I) are N,N'-bis(hydroxymethyl) piperazine, N,N'-biS(hydroxymethyl)-methyl piperazine, N,N'-bis(2-hydroxyethyl) piperazine, N,N'-bis(2-hydroxypropyl) piperazine, N,N'-bis(2-hydroethyl)-2,5-dimethyl piperazine, N,N'-bis(2-hydroxypropyl)-2,5-dimethyl piperazine, N,N'-bis(2-methyl-2-hydroxypropyl) piperazine, N,N'-bis(2-methyl-2-hydroxynonyl) piperazine, and the like.

(2) Dicarboxylic acids and functional derivatives thereof which are possessed of groups represented by the generic formula (I) are N,N'-bis(carboxymethyl) piperazine, N,N'-bis(2-carboxyethyl) piperazine, N,N'-bis(carboxymethyl)2,6-dimethyl piperazine, N,N'-bis(3-carboxypropyl) piperazine, N-(2-carboxyethyl)-N'-(carboxymethyl) piperazine, lower alkyl esters and chlorides of said dicarboxylic acids, and the like.

(3) Glycols which are possessed of groups represented by the generic formula (II) are diethanolamine, N,N'-bis(2-hydroxyethyl) methylamine, N,N-bis(2-hydroxypropyl) ethylamine, N,N-bis(2-hydroxypropyl) methylamine, and N,N-bis(2-hydroxypropyl) isopropylamine, and the like.

(4) Dicarboxylic acids and functional derivatives thereof which are possessed of groups represented by the generic formula (II) are N,N-bis(carboxymethyl) methylamine, N,N-bis(2-carboxyethyl) methylamine, N,N-bis(carboxyethyl)-isopropylamine, N-carboxymethyl-N-(2-carboxyethyl) methylamine, and lower alkyl esters and chlorides of said carboxylic acids, and the like.

(5) Glycols which are possessed of groups represented by the generic formula (III) are N,N'-dimethyl-N,N'-bis(2-hydroxyethyl) ethylenediamine, N,N'-diethyl-N,N'-bis(2-hydroxypropyl) ethylenediamine, N,N'-di-n-butyl-N,N-bis(2-hydroxypropyl) pentamethylenediamine, and the like.

(6) Dicarboxylic acids and functional drivatives thereof which are possessed of groups represented by the generic formula (III) are N,N'-dimethyl-N,N'-bis(carboxymethyl) ethylenediamine, N,N'-dimethyl-N,N'-bis(2-carboxyethyl) ethylenediamine, N,N'-dimethyl-N,N'-bis(3-carboxypropyl) hexamethylenediamine, lower alkyl esters and chlorides of said dicarboxylic acids, and the like.

(7) Glycols which are possessed of groups represented by the generic formula (IV) are 2-methyl-2-N,N-dimethylaminomethyl-1,3-propanediol, 2-methyl-2-N,N-diethylaminomethyl-1,3-propanediol, 2-ethyl-2-N,N-di-n-propylaminomethyl-1,3-propanediol, 2-methyl-2-N,N-di-n-butylaminomethyl-1,3-propanediol, 2-methyl-2-N,N-dimethylaminoethyl-1,3-propanediol, 2-methyl-2-piperizinomethyl-1,3-propanediol, 2,2-bis(dimethylaminomethyl)-1,3-propanediol, 2,2-bis(diisopropylaminomethyl)-1,3-propanediol, 3-methyl-3-N,N-dimethylaminomethyl-1,5-pentanediol, 3-methyl-3-N,N-diethylaminomethyl-1,5-pentanediol, 4-ethyl-4-N,N-isopropylaminomethyl-1,6-hexanediol, and the like.

(8) Dicarboxylic acids and functional derivatives thereof which are possessed of groups represented by the generic formula (IV) are 4-methyl-4-N,N-dimethylaminomethyl azelaic acid, 5-methyl-5-N,N-diethylaminoethyl undecanoic acid, 6-ethyl-6-N,N-di-n-propylaminomethyl brassylic acid, 9-methyl-9-N,N-dimethylaminomethyl nonadecanoic acid, lower alkyl esters and chlorides of said dicarboxylic acids, and the like.

(9) Glycols which are possessed of groups represented by the generic formula (V) are 3,5-dimethylolpyridine, 2,5-dimethylolpyridine, and the like.

(10) Dicarboxylic acids which are possessed of groups represented by the generic formula (V) are 3,5-di(carboxymethyl)pyridine 2,5-di(carboxymethyl)pyridine, lower alkyl esters and chlorides of said dicarboxylic acids, and the like.

The manufacture of the copolyester according to the present invention, though possibly effected by an ordinary method, is preferably accomplished by either of the following methods:

One method comprises causing terephthalic acid or a functional derivative thereof and at least one dicarboxylic acid or a functional derivative thereof selected from the class consisting of aliphatic dicarboxylic acids, aromatic dicarboxylic acids other than terephathalic acid, and functional derivatives thereof to be directly esterified or transesterified with an alkylene glycol, then allowing the resultant esterification product to be reacted with a glycol or a dicarboxylic acid containing a tertiary amino group or a functional derivative thereof, to give a copolyester containing tertiary amino groups. The other method comprises causing terephathalic acid or a functional derivative thereof and at least one dicarboxylic acid or a functional derivative thereof selected from the class consisting of aliphatic dicarboxylic acids, aromatic dicarboxylic acids other than terephthalic acid, and functional derivatives thereof to be directly esterified or transesterified with an alkylene glycol, to a copolyester, separately preparing a polyester containing a tertiary amino group from at least one glycol or dicarboxylic acid or a functional derivative thereof selected from the class consisting of glycols and dicarboxylic acids containing a tertiary amino group and functional derivatives thereof and at least one dicarboxylic acid or a functional derivative thereof or at least one glycol selected from the class consisting of aromatic dicarboxylic acids, aliphatic dicarboxylic acids, functional derivatives of said acids, and alkylene glycols, and subsequently melting and mixing the two polyesters to copolymerize them.

The copolyester in the present invention is desired to have acid components such that the proportion (molar ratio) of terephthalic acid component to acid components other than terephthalic acid falls in the range of from 80 : 20 to 20 : 80. Besides, the glycol components or dicarboxylic acid components possessed of groups represented by the aforementioned generic formulas (I) through (V) are desired to be in such amounts that the proportion of glycol components containing a tertiary amino group to all the glycol components present falls in the range of from 1 : 100 to 50 : 100 by molar ratio or the proportion of dicarboxylic acid components containing a tertiary amino group to all the dicarboxylic acid components present falls in the range of from 1 : 100 to 50 : 100. The polyester is further desired to have a reduced viscosity, $\eta SP/C$ (measured in chloroform as the solvent under conditions of C = 0.4 g/dl and at 30° C), in the range of from 0.2 to 2.0. The polyester adhesive of the present invention has the copolyester of the foregoing description as its effective component.

The adhesive of the present invention, for various purposes other than for adhesion, may incorporate pigments, dyes, various modifiers such as, for example, flame retardants, flame retarding assistants, weather stabilizers, ultraviolet ray absorbents, and antiblocking agents, crystal seeds, fillers, reinforcements, and the like.

Incorporation of other various types of polyesters is also permissible. An Example of the polyester which may be incorporated is that which is obtained by combination of terephthalic acid or a functional derivative thereof, an aliphatic dicarboxylic acid or a functional derivative thereof, and at least one alkylene glycol.

A wide variety of methods can be employed for actual use of the adhesive of the present invention: Examples include a method which comprises the steps of shaping the adhesive by an ordinary method in the form of a tape, ribbon, film, bar, rectangular sheet, strand or the like, inserting the shaped adhesive between the opposed surfaces of substrates desired to be joined and melting the inserted adhesive to cause desired adhesion of the substrates, a so-called dip-coat method which comprises melting the adhesive and applying the melt adhesive to the opposed surfaces of the substrates to cause the adhesion, and a method which comprises dissolving the adhesive in a solvent, applying the resultant solution to the opposed surfaces of the substrates, treating the applied solution so as to expel the solvent therefrom and thereafter melting the applied film to cause the adhesion.

The adhesive of the present invention is excellent in various adhesive properties and provides desired adhesion without reference to the materials and shapes of the substrates given to be joined. Especially, it manifests such adhesive properties to the full extent in the adhesion of metals. The copolyester serving as the effective component of the adhesive of this invention enjoys various excellent properties as well as outstanding adhesive properties. For example, the polyester is capable of being cured by ultraviolet rays, so that the adhesive of this invention can also be used as a photo-curing type adhesive.

Now, the present invention will be described specifically with reference to working examples.

In the examples, the term "parts," means "parts by weight." The following properties mentioned in the examples have been measured by the methods described below:

Reduced viscosity, $\eta SP/C$, of polymer — A given polymer was dissolved in chloroform as the solvent to a concentration of the 0.4 g/dl and tested for the viscosity at 30° C.

Melting point of polymer — A given polymer in a finely divided form was hot rolled, cooled, then cold drawn, placed between two cover glasses and observed under a microscope while being heated at a temperature increase ratio of 1° C/minute. The temperature at which the brilliance of crystalline structure vanished was reported as the melting point of this polymer.

T-peel strength (in kg/cm) according to JIS K6854-73 — A given adhesive in the form of a film was inserted between two test pieces each measuring 100 $\mu$ in thickness and 7 cm $\times$ 6 cm in area. The test pieces were bonded by melting the adhesive at a temperature 60° C higher than the melting point of the polymer under a pressure of 5 kg/cm$^2$ for two minutes so that the adhesive layer consequently formed between the fusion bonded test pieces had a thickness of 100 $\mu$. The bonded specimen thus obtained was cut into strips 1 cm in width. The strips were tested for T-peel strength by means of a tensile strength tester "Tensilon" at 23° C and 100° C, with the cross-head speed fixed at 200 mm/minute.

Shear strength (in kg/cm$^2$) according to JIS K6850-72 — A given adhesive in the form of a film was inserted between two test pieces (each measuring 1.6 mm in thickness and 1 cm $\times$ 10 cm in area) (with the area of adhesion of the adhesive fixed at 1 cm$^2$). The test pieces were bonded by melting the adhesive at a temperature 60° C higher than the melting point of the polymer under a pressure of 5 kg/cm$^2$ for two minutes (so that the adhesive layer consequently formed between the melt bonded test pieces had a thickness of 100 $\mu$). At 23° C and 100° C, the bonded specimen thus obtained was tested with a Tensilon for bond strength by having the two test pieces pulled in opposite directions parallel to the plane containing the bonded face, with the cross-head speed fixed at 20 mm/minute.

EXAMPLE 1

A reactor was charged with a prescribed amount of dimethyl terephthalate and a prescribed amount of glycol (2.2 times that of the dicarboxylic acid in molar ratio) mixed with zinc acetate (0.030 mol% based on acid) and antimony trioxide (0.025 mol% based on acid). The charge was heated from 150° C to 210° C over 2 hours to expel the theoretical amount of methanol therefrom. Then, the reaction product was transferred into an autoclave, in which the product was added by a required amount of an aliphatic dicarboxylic acid and, under a continuous flow of nitrogen gas, heated from 210° C to 260° C over 30 minutes to undergo esterification. After raising the temperature to 260° C, the reaction system was reduced in pressure to 0.1 mmHg over 30 minutes. Under the resultant conditions, the reaction system was allowed to undergo polycondensation for 45 minutes to afford a copolyester (a).

The prescribed amounts referred to above are those indicated in the following table.

| Run | Copolyester (a) | | | |
|---|---|---|---|---|
| | Acid | | | |
| No. | Parts by weight | Parts by weight | Parts by weight | Glycol |
| 1 | DMT 252 | DDA 161 | | EG 273 |
| 2 | DMT 252 | SA 141 | | " |
| 3 | DMT 252 | AA 102 | | " |
| 4 | DMT 252 | DDA 161 | | " |
| 5 | DMT 252 | DDA 161 | | " |
| 6 | DMT 155 | DDA 276 | | " |
| 7 | DMT 194 | DDA 230 | | " |
| 8 | DMT 272 | DDA 138 | | " |
| 9 | DMT 116 | DMI 116 | SA 162 | BD 396 |
| 10 | DMT 116 | DMI 116 | SA 162 | " |
| 11 | DMT 252 | DDA 161 | | EG 273 |
| 12 | DMT 252 | SA 141 | | " |
| 13 | DMT 252 | AA 102 | | " |

The abbreviations in the foregoing table have the following meanings (They have the same meanings in the following tables.)
DMT - Dimethyl terephthalate
DDA - Dodecanedioic acid
SA - Sebacic acid
AA - Adipic acid
DMI - Dimethyl isophthalate
EG - Ethylene glycol
BD - Tetramethylene glycol Separately, an autoclave was charged with 1 mol of terephthalic acid, 1.1 mols of 2-methyl-2-dimethylaminomethyl-1,3-propanediol and 1% by weight, based on said terephthalic acid, of phosphorous acid. The charge was heated at 210°–220° C under a continuous flow of nitrogen gas for 90 minutes so as to undergo esterification, while the water occurring in consequence of the reaction was distilled out as it formed. After that, the reaction system was reduced in pressure to 3 mmHg and allowed to undergo polycondensation for 2 hours. As a result, there was obtained a polyester (b) having the following repeating unit.

tertiary amino group thus obtained was found to have the properties as indicated in Table 1.

Table 1

| | Copolyester(a) | | | Polyester(b) containing a tertiary amino group (parts) | Copolyester(I) containing a tertiary amino group | | T-Peel strength (aluminum foil) | | Shear strength (aluminum sheet) | |
|---|---|---|---|---|---|---|---|---|---|---|
| No. | Acids (molar ratio of components) | Glycol | Parts | | Melting Point (° C) | ηSP/C | 23° C | 100° C | 23° C | 100° C |
| 1 | TPA/DDA=65/35 | EG | 90 | 10 | 155 | 0.698 | 2.40 | 0.45 | 135 | 40 |
| 2 | TPA/SA=65/35 | " | 90 | 10 | 157 | 0.651 | 1.85 | 0.40 | 136 | 43 |
| 3 | TPA/AA=65/35 | " | 90 | 10 | 163 | 0.660 | 1.53 | 0.38 | 143 | 48 |
| 4 | TPA/DDA=65/35 | " | 95 | 5 | 159 | 0.713 | 1.81 | 0.40 | 130 | 43 |
| 5 | TPA/DDA=65/35 | " | 98 | 2 | 162 | 0.733 | 1.51 | 0.31 | 126 | 36 |
| 6 | TPA/DDA=40/60 | " | 90 | 10 | 80 | 0.700 | 3.15 | 0.08 | 82 | 30 |
| 7 | TPA/DDA=50/50 | " | 90 | 10 | 123 | 0.700 | 3.08 | 0.17 | 110 | 40 |
| 8 | TPA/DDA=70/30 | " | 90 | 10 | 168 | 0.700 | 2.38 | 0.55 | 153 | 65 |
| 9 | TPA/IPA/SA=30/30/40 | BD | 90 | 10 | 120 | 0.658 | 1.23 | 0.38 | 120 | 40 |
| 10 | TPA/IPA/SA=30/30/40 | " | 100 | — | 131 | 0.615 | 0.73 | 0.21 | 50 | 20 |
| 11 | TPA/DDA=65/35 | EG | 100 | — | 165 | 0.710 | 0.80 | 0.28 | 76 | 28 |
| 12 | TPA/SA=65/35 | " | 100 | — | 168 | 0.730 | 0.70 | 0.31 | 78 | 30 |
| 13 | TPA/AA=65/35 | " | 100 | — | 172 | 0.751 | 0.51 | 0.25 | 85 | 38 |

In the preceding table, the abbreviations have the following meanings:
TPA - Terephthalic acid
IPA - Isophthalic acid
NO 10 through 13 and 15 represent the cases cited by way of comparison.

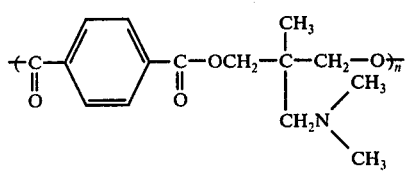

The two polyesters (a) and (b) were mixed in the proportions indicated in Table 1, and melted at 260° C for 30 minutes under a continuous flow of nitrogen gas so as to copolymerize. The copolyester (I) containing a

EXAMPLE 2

A reactor was charged with 126.1 parts of dimethyl terephathalate, 136.4 parts of ethylene glycol, 0.074 part of zinc acetate and 0.062 part of antimony trioxide. The charge was heated from 150° C to 210° C over 2 hours so as to undergo esterification, while the water occurring in consequence of the reaction was distilled out as it formed. Then, the reaction product was transferred into an autoclave, in which 80.5 parts of dodecanedioic acid was added and, under a continuous flow of nitrogen gas, heated from 210° C to 260° C over 30 minutes so as to undergo esterification. After raising the temperature to 260° C, the reaction system was reduced in pressure at a rate such that the inner pressure fell to 0.1 mmHg over 30 minutes. Under the resultant conditions, the reaction system was allowed to undergo polycondensation to afford a copolyester (C).

Separately, a polyester containing a tertiary amino group (d) was polymerized as shown below.

An autoclave was charged with 1 mol of terephthalic acid, 1.1 mols of N,N-bis(2-hydroxypropyl) methylamine or N,N'-bis(2-hydroxypropyl) piperazine and 1% by weight, based on the terephthalic acid, of phosphorous acid. The charge was heated at 210°–220° C under a continuous flow of nitrogen gas for 90 minutes so as to undergo esterification, while the water occurring in consequence of the reaction was distilled out as it formed. Then, the reaction system was reduced in pressure to 3 mmHg. Under the resultant conditions, the reaction system was allowed to undergo polycondensation to afford a polyester (d-1) or (d-2) which was found to have the following repeating unit.

system was allowed to undergo polycondensation for 2 hours to afford a copolyester containing a tertiary amino group. The copolyester was found to possess the properties as indicated in Table 3.

Table 3

| | Copolyester containing a tertiary amino group | | | T-Peel strength | | | | | | Shear strength (aluminum sheet) | |
|---|---|---|---|---|---|---|---|---|---|---|---|
| | | Melting Point | | Aluminum foil | | Polyethylene terephthalate film (100 μ) | | Polycarbonate film (100 μ) | | | |
| | Glycol | (° C) | ηSP/C | 23° C | 100° C | 23° C | 100° C | 23° C | 100° C | 23° C | 100° C |
| 1 | A | 155 | 0.683 | 2.55 | 0.44 | 2.5 | 1.0 | 4.3* | 1.3 | 138 | 41 |
| 2 | B | 157 | 0.613 | 2.21 | 0.41 | 2.4 | 1.0 | 4.0 | 1.0 | 134 | 42 |
| 3 | — | 165 | 0.710 | 0.80 | 0.28 | 1.0 | 0.4 | 3.0 | 0.8 | 76 | 28 |

*A rupture occurred in the polycarbonate film.

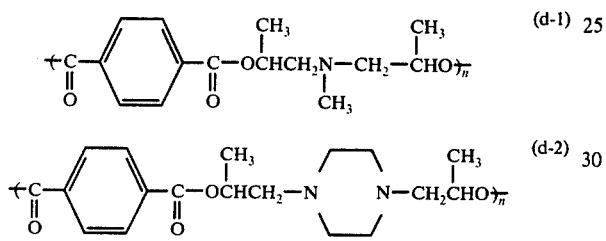

The copolyester (d-1) or (d-2) and the polyester (c) containing a tertiary amino group were mixed in the proportions indicated in Table 2 and melted at 260° C under a continuous flow of nitrogen gas for 30 minutes so as to undergo copolymerization. The copolyester (II) containing a tertiary amino group thus produced was found to have the properties as indicated in Table 2.

Table 2

| | Copolyester containing a tertiary amino group (II) | | | | | | | |
|---|---|---|---|---|---|---|---|---|
| | Polyester containing a tertiary amino group (d) | Melting Point | | T-Peel strength (aluminum foil) | | Shear strength (aluminum sheet) | | |
| Copolyester (c) | | (° C) | ηSP/C | 23° C | 100° C | 23° C | 100° C | |
| 1 | 90 parts | (d-1) 10 parts | 153 | 0.651 | 2.15 | 0.43 | 130 | 35 |
| 2 | 95 parts | (d-1) 5 parts | 158 | 0.680 | 2.20 | 0.48 | 131 | 38 |
| 3 | 90 parts | (d-2) 10 parts | 152 | 0.648 | 2.18 | 0.40 | 133 | 40 |
| 4 | 95 parts | (d-2) 5 parts | 157 | 0.695 | 2.25 | 0.51 | 139 | 43 |
| 5 | 100 parts | — | 165 | 0.710 | 0.80 | 0.28 | 76 | 28 |

No. 5 given in the table represents a case cited by way of comparison.

EXAMPLE 3

A reactor was charged with 165.1 parts of bis(β-hydroxyethyl) terephthalate, 80.5 parts of dodecanedioic acid, 0.16 mol of 2-methyl-2-dimethylaminomethyl-1,3-propanediol (Referred to as "glycol A") or N,N'-bis(2-hydroxypropyl) piperazine (Referred to as "glycol B"), and 0.062 part of antimony trioxide. The charge was heated at 220° C under a continuous flow of nitrogen gas for 90 minutes so as to undergo esterification. Then the reaction system was heated to 240° C and reduced in pressure to 0.3 mmHg over a period of 30 minutes. Under the resultant conditions, the reaction

EXAMPLE 4

In the same manner as described in Example 1, a copolyester (a-1) was obtained from the following raw materials.

Dimethyl terephthalate — 252 parts
Ethylene glycol — 273 parts
Zinc acetate — 0.13 part
Antimony trioxide — 0.14 part
Dodecanedioic acid — 161 parts From the following sets of raw materials, polyesters (e) containing three different tertiary amino groups were obtained by following the procedure of Example 1.

| (e-1) | Terephthalic acid | 1 mol |
| | N,N'-dimethyl-N,N'-bis(2-hydroxyethyl) ethylenediamine | 1.1 mols |
| | Phosphorous acid | 1% by weight based on terephthalic acid |
| (e-2) | Terephthalic acid | 1 mol |
| | 3,5-Dimethylol pyridine | 1.1 mols |
| | Phosphorous acid | 1% by weight based on terephthalic acid |
| (e-3) | Terephthalic acid | 1 mol |
| | 2,2-bis(dimethylaminomethyl) 1,3-propanediol | 1.1 mols |
| | Phosphorous acid | 1% by weight based on terephthalic acid |

The copolyester (a-1) and the polyester (e) having a different tertiary amino group were mixed and melted in the proportions indicated in Table 4 under a continuous flow of nitrogen gas at 260° C for 30 minutes so as to copolymerize. The copolyester containing the tertiary amino group which was consequently obtained was found to have the properties as shown in Table 4.

Table 4

| Copoly-ester (a-1) | Copolyester containing a tertiary amino group Polyester containing a tertiary amino group (e) | Melting Point (°C) | ηSP/C | T-Peel strength (aluminum foil) | | Shear strength (aluminum sheet) | |
|---|---|---|---|---|---|---|---|
| | | | | 23°C kg/cm | 100°C kg/cm | 23°C kg/cm² | 100°C kg/cm² |
| 1 | 90 parts | (e-1) 10 parts | 155 | 0.630 | 2.05 | 0.40 | 120 | 35 |
| 2 | 90 parts | (e-2) 10 parts | 155 | 0.635 | 2.10 | 0.40 | 125 | 38 |
| 3 | 90 parts | (e-3) 10 parts | 153 | 0.600 | 2.35 | 0.42 | 130 | 40 |
| 4 | 100 parts | — | 165 | 0.710 | 0.80 | 0.28 | 76 | 28 |

EXAMPLE 5

A copolyester (a-1) was obtained in the same manner as described in Example 1. Then, polyesters (f) containing five different tertiary amino groups were polymerized from the following sets of raw materials by following the procedure of Example 1.

| (f-1) | N,N'-bis(carboxymethyl) piperazine<br>Ethylene glycol<br>Phosphorous acid | 1 mol<br>1.1 mols<br>1% by weight based on dicarboxylic acid |
|---|---|---|
| (f-2) | N,N-bis(carboxylmethyl) methylamine<br>Ethylene glycol<br>Phosphorous acid | 1 mol<br>1.1 mols<br>1% by weight based on dicarboxylic acid |
| (f-3) | N,N'-dimethyl-N,N'-bis(carboxymethyl) ethylenediamine<br>Ethylene glycol<br>Phosphorous acid | 1 mol<br>1.1 mols<br>1% by weight based on dicarboxylic acid |
| (f-4) | 4-methyl-4-N,N-dimethylaminomethyl-azelaic acid<br>Ethylene glycol<br>Phosphorous acid | 1 mol<br>1.1 mols<br>1% by weight based on dicarboxylic acid |
| (f-5) | 3,5-Di(carboxymethyl) pyridine<br>Ethylene glycol<br>Phosphorous acid | 1 mol<br>1.1 mols<br>1% by weight based on dicarboxylic acid |

The copolyester (a-1) and the polyester (f) having a different tertiary amino group were mixed and melted at the proportion indicated in Table 5 under a continuous flow of nitrogen gas at 260° C for 30 minutes so as to copolymerize. The copolyester containing the tertiary amino group which was consequently obtained was found to have the properties as shown in Table 5.

Table 5

| | Copolyester containing a tertiary amino group | | | | | | |
|---|---|---|---|---|---|---|---|
| | Copoly-ester (a-1) | Polyester containing a tertiary amino group (f) | Melting Point (°C) | ηSP/C | T-Peel strength (aluminum foil) | | Shear strength (aluminum sheet) | |
| | | | | | 23°C kg/cm | 100°C kg/cm | 23°C kg/cm² | 100°C kg/cm² |
| 1 | 90 parts | (f-1) 10 parts | 155 | 0.635 | 2.05 | 0.41 | 130 | 35 |
| 2 | 90 parts | (f-2) 10 parts | 155 | 0.660 | 2.13 | 0.42 | 135 | 40 |
| 3 | 90 parts | (f-3) 10 parts | 155 | 0.605 | 2.23 | 0.40 | 120 | 38 |
| 4 | 90 parts | (f-4) 10 parts | 155 | 0.610 | 2.04 | 0.45 | 125 | 38 |
| 5 | 90 parts | (f-5) 10 parts | 155 | 0.675 | 2.30 | 0.45 | 135 | 40 |
| 6 | 100 parts | — | 165 | 0.710 | 0.80 | 0.28 | 76 | 28 |

EXAMPLE 6

A copolyester (a-1) was obtained in the same manner as described in Example 1. Then, a polyester (g) containing a tertiary amino group was polymerized by repeating the procedure of Example 1.

| 3,5-Dicarboxypyridine | 1 mol |
|---|---|
| 2-methyl-2-N,N-dimethylaminomethyl-1,3-propane diol | 1.1 mols |
| Phosphorous acid | 1% by weight based on dicarboxylic acid |

The copolyester (a-1) and the polyester (g) containing the tertiary amino group were mixed and melted at the proportion indicated in Table 6 under a continuous flow of nitrogen gas in 260° C for 30 minutes. The copolyester containing the tertiary amino group which was consequently obtained was found to have properties as shown in Table 6.

Table 6

| | Copolyester containing a tertiary amino group | | | | | | |
|---|---|---|---|---|---|---|---|
| | Copoly-ester (a-1) | Polyester containing a tertiary amino group (g) | Melting Point (°C) | ηSP/C | T-Peel strength (aluminum foil) | | Shear strength (aluminum sheet) | |
| | | | | | 23°C kg/cm | 100°C kg/cm | 23°C kg/cm² | 100°C kg/cm² |
| 1 | 90 parts | 10 parts | 150 | 0.605 | 2.05 | 0.44 | 130 | 35 |
| 2 | 100 parts | — | 165 | 0.710 | 0.80 | 0.28 | 76 | 28 |

EXAMPLE 7 (COMPARATIVE EXAMPLE):

A reactor was charged with 2 mols of dimethyl sebacate or 2 mols of dimethyl terephthalate and 4.4 mols of ethylene glycol mixed with 0.13 part of zinc acetate and 0.14 part of antimony trioxide. The charge was heated from 150° C to 210° C over 2 hours to distill out the theoretical amount of methanol therefrom. Then, the reaction product was transferred into an autoclave, and was heated from 210° C to 260° C over 30 minutes to undergo esterification. After raising the temperature to 260° C, the reaction system was reduced in pressure to 0.1 mmHg over 30 minutes. Under the resultant conditions, the reaction system was allowed to undergo polycondensation for 45 minutes. Thus were obtained two polyesters (h) (h-1-dimethyl sebacate had h-2-dimethyl terephthalate).

Separately, a polyester (b) containing a tertiary amino group was polymerized by following the procedure of Example 1.

The two polyesters (h) were mixed and melted independently with the polyester (b) containing the tertiary amino group in the proportions indicated in Table 7 under a continuous flow of nitrogen gas at 260° C for 30 minutes so as to undergo copolymerization. The copolyesters containing the tertiary amino group which were consequently obtained were found to possess the properties as shown in Table 7.

Table 7

| | Copolyester containing a tertiary amino group | | | | T-Peel strength (aluminum foil) | | Shear strength (aluminum sheet) | |
|---|---|---|---|---|---|---|---|---|
| | Polyester containing a | Melting | | | 23° C | 100° C | 23° C | 100° C |
| | tertiary | Point | | | | | | |
| | ester (h) | amino group (b) | (° C) | ηSP/C | kg/cm | kg/cm | kg/cm² | kg/cm² |
| 1 | (h-1) 90 parts | 10 parts | 60 | 0.450 | 0.10 | 0 | 5 | 0 |
| 2 | (h-2) 90 parts | 10 parts | 240 | 0.670 | 0.10 | 0 | 10 | 0 |

EXAMPLE 8 (COMPARATIVE EXAMPLE):

An autoclave was charged with 0.65 mol of terephthalic acid, 0.35 mol of dodecanedioic acid, 1.1 mols of 2-methyl-2-N,N-dimethylaminomethyl-1,3-propanediol and 1% by weight, based on said terephthalic acid, of phosphorous acid. The charge was heated at 210° - 220° C under a continuous flow of nitrogen gas for 90 minutes to undergo esterification, while the water occurring in consequence of the reaction was distilled out as it formed. After that, the reaction system was reduced in pressure to 3 mmHg and left to undergo polycondensation for two hours. As a result, there was obtained a copolyester (i) containing a tertiary amino group.

The copolyester containing the tertiary amino group which was consequently obtained was found to have the properties as shown in Table 8.

Table 8

| Copolyester containing a tertiary amino groups (i) | | T-Peel strength (aluminum foil) | | Shear sheet (aluminum sheet) | |
|---|---|---|---|---|---|
| Melting Point (° C) | ηSP/C | 23° C | 100° C | 23° C | 100° C |
| 1 | 35 | 0.500 | 0.15 | 0 | 15 | 0 |

EXAMPLE 9

A copolyester (a-1) was obtained by following the procedure of Example 1.

Then, a polyester (b) containing a tertiary amino group was obtained by following the procedure of Example 2. At 260° C under a continuous flow of nitrogen gas, 80 parts of said copolyester and 20 parts of the polyester containing the tertiary amino group were mixed and melted for 30 minutes to undergo copolymerization. There was consequently obtained a copolyester (A) containing the tertiary amino group which was found to have a melting point of 143° C and a reduced viscosity of ηSP/C=0.6109.

Separately, a copolyester (B) was polymerized from 291 parts of dimethyl terephthalate, 115 parts of dodecanedioic acid and 273 parts of ethylene glycol in the same manner as described in Example 1.

Then, 50 parts of the copolyester (A) and 50 parts of the copolyester (B) were mixed and melted at 260° C under a continuous flow of nitrogen gas for 30 minutes. The resultant product was found to have the properties as shown in Table 9.

Table 9

| Melting Point (° C) | ηSP/C | T-Peel strength (aluminum foil) | | Shear strength (aluminum sheet) | |
|---|---|---|---|---|---|
| | | 23° C | 100° C | 23° C | 100° C |
| 153 | 0.450 | 2.54 | 0.45 | 130 | 40 |

What is claimed is:

1. A polyester adhesive having as the effective component thereof a copolyester containing a tertiary amino group comprising:

(1) a terephthalic acid residue, the amount of which makes up 80 to 20 mol % of the total amount of all the carboxylic acid residues present;

(2) at least one dicarboxylic acid residue selected from the group consisting of aliphatic dicarboxylic acid residues and aromatic dicarboxylic acid residues other than a terephthalic acid residue, the amount of which makes up 20 to 80 mol % of the total amount of all the carboxylic acid residues present;

(3) at least one alkylene glycol residue, the amount of which makes up 50 to 99 mol % of the total amount of all the glycol residues present; and (4) at least one glycol residue possessed of the group represented by the following generic formula:

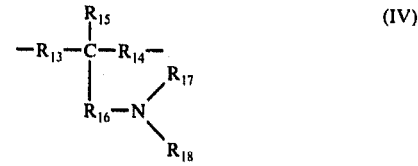

(IV)

wherein $R_{13}$, $R_{14}$ and $R_{16}$ are each an alkylene group of 1 to 15 carbon atoms, $R_{17}$ and $R_{18}$ are either, independently, a hydrogen atom or an alkyl group of 1 to 4 carbon atoms or, in combination, make up a polymethylene group which may form a heterogeneous ring in conjunction with the adjoining nitrogen atom, and $R_{15}$ is an alkyl group of from 1 to 3 carbon atoms or

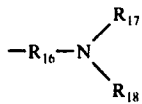

the amount of which makes up 50 to 1 mol % of the total amount of all the glycol residues present, the said copolyester having a reduced viscosity, $\eta_{sp/c}$ as measured in chloroform as the solvent under conditions of $c = 0.4$ g/dl and 30° C in the range of from 0.2 to 2.0.

2. The polyester adhesive set forth in claim 1, wherein the aliphatic dicarboxylic acid which provides said aliphatic dicarboxylic acid residue is adipic acid, azelaic acid, sebacic acid or dodecanedioic acid.

3. The polyester adhesive set forth in claim 1, wherein the aromatic dicarboxylic acid other than terephthalic acid which provides said aromatic dicarboxylic acid residue is isophthalic acid.

4. The polyester adhesive set forth in claim 1, wherein the alkylene glycol which provides said alkylene glycol residue is ethylene glycol, propylene glycol, tetramethylene glycol, hexamethylene glycol or neopentyl glycol.

5. The polyester adhesive set forth in claim 1, wherein the glycol residue possessed of said generic formula is derived from 2-methyl-2-N,N-dimethylaminomethyl-1,3-propanediol, 2-methyl-2-N,N-diethylaminomethyl-1,3-propanediol, 2-ethyl-2-N,N-di-n-propylaminomethyl-1,3-propanediol, 2-methyl-2-N,N-di-n-butyl-aminomethyl-1,3-propanediol, 2-methyl-2-N,N-dimethylaminoethyl-1,3-propanediol, 2-methyl-2-piperizinomethyl-1,3-propanediol, 2-N,N-bis(dimethylaminomethyl)-1,3-propanediol, 2-N,N-bis(di-isopropylaminomethyl)-1,3-propanediol, 3-methyl-3-N,N-dimethylaminomethyl-1,5-pentanediol, 3-methyl-3-N,N-diethylaminomethyl-1,5-pentanediol or 4-ethyl-4-N,N-di-isopropylaminomethyl-1,6-hexanediol.

6. The polyester adhesive set forth in claim 1, wherein the glycol residue possessed of said generic formula is derived from 2-methyl-2-dimethylaminomethyl-1,3-propanediol.

* * * * *